(12) United States Patent
Chen et al.

(10) Patent No.: US 9,857,620 B2
(45) Date of Patent: Jan. 2, 2018

(54) DISPLAY DEVICE

(71) Applicant: InnoLux Corporation, Miao-Li County (TW)

(72) Inventors: Shao-Hong Chen, Miao-Li County (TW); Li-Wei Sung, Miao-Li County (TW); Po-Ju Yang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/256,796

(22) Filed: Sep. 6, 2016

(65) Prior Publication Data

US 2017/0068130 A1 Mar. 9, 2017

(30) Foreign Application Priority Data

Sep. 6, 2015 (CN) .......................... 2015 1 0558125

(51) Int. Cl.
| | | |
|---|---|---|
| *G02F 1/1335* | (2006.01) | |
| *G02F 1/1339* | (2006.01) | |
| *G02F 1/1333* | (2006.01) | |

(52) U.S. Cl.
CPC .... *G02F 1/133512* (2013.01); *G02F 1/13394* (2013.01); *G02F 1/133377* (2013.01); *G02F 2001/13396* (2013.01)

(58) Field of Classification Search
CPC ..... G02F 1/133512; G02F 2001/13396; G02F 1/133377; G02F 1/13394
See application file for complete search history.

(56) References Cited

U.S. PATENT DOCUMENTS

| | | | | |
|---|---|---|---|---|
| 9,638,963 | B2* | 5/2017 | Lee ..................... | G02F 1/13394 |
| 2005/0190337 | A1* | 9/2005 | Park ..................... | G02F 1/1334 |
| | | | | 349/155 |
| 2014/0320795 | A1* | 10/2014 | Hiratsuka ......... | G02F 1/134363 |
| | | | | 349/139 |
| 2015/0205160 | A1* | 7/2015 | Kim .................. | G02F 1/133512 |
| | | | | 349/42 |
| 2015/0346534 | A1* | 12/2015 | Lee ..................... | G02F 1/13394 |
| | | | | 349/43 |

* cited by examiner

*Primary Examiner* — Joseph L Williams
*Assistant Examiner* — Jose M Diaz
(74) *Attorney, Agent, or Firm* — Bacon & Thomas, PLLC (57) ABSTRACT

A display device is disclosed, which comprises: a first substrate; a second substrate; a black matrix layer having a light shielding portion and a light transmitting portion; and a main spacer disposed between the first substrate and the second substrate and at least partially overlapping with the light shielding portion. The light transmitting portion has openings, which define sub-pixel units including a first adjusted sub-pixel unit, a second adjusted sub-pixel unit, and a standard sub-pixel unit. The main spacer is disposed on a border junction between the first and second adjusted sub-pixel units, but is not disposed on a border of the standard sub-pixel unit. Areas of the first and second adjusted sub-pixel units are respectively greater than an area of the standard sub-pixel unit.

9 Claims, 6 Drawing Sheets

DISPLAY DEVICE

CROSS REFERENCE TO RELATED APPLICATION

This application claims the benefits of the China Patent Application Serial Number 201510558125.0, filed on Sep. 6, 2015, the subject matter of which is incorporated herein by reference.

BACKGROUND

1. Field of the Invention

The present disclosure relates to a display device. More particularly, the present disclosure relates to a display device in which areas of sub-pixel units near main spacers have been adjusted.

2. Description of Related Art

As display technology advances, all devices are now being developed in smaller sizes with thinner thicknesses and lighter weights. As a result, the mainstream display devices in the market have changed from the previous cathode ray tube to the current liquid crystal display device. In particular, liquid crystal display device can be applied in many fields. For example, most of the display devices used in daily life, such as mobile phones, laptop computers, video cameras, cameras, music players, mobile navigation devices, and televisions, use liquid crystal display panels.

In general, a liquid crystal display panel is manufactured by covering liquid crystal molecules using an upper substrate and a lower substrate. Units used to define the thickness of a liquid crystal layer include main spacers and sub-spacers. Through alignment layers, main spacers and sub-spacers respectively contact the upper and lower substrates directly.

More specifically, during a manufacturing process of a liquid crystal display panel, main spacers are first formed on one of the upper and lower substrates. The upper and lower substrates are then assembled. Main spacers are the main supporting structures between the upper and lower substrates. However, displacement of main spacers may occur due to external environmental stress during manufacturing process. Consequently, alignment layers will be abraded, alignment of liquid crystal molecules will become poor, and light leakage will occur.

Accordingly, there is a need to develop a display device in which light leakage due to abrasion of alignment layer by main spacers can be improved. Thereby, display quality of display device can be enhanced.

SUMMARY

The present disclosure relates to a display device. According to some embodiments, by adjusting the area of the light shielding regions of a black matrix layer where main spacers are disposed and adjusting the area of sub-pixel units, light leakage due to damage of an alignment layer can be avoided. The display quality of the display device can then be improved.

A display device of the present disclosure comprises: a first substrate; a second substrate disposed opposite to the first substrate; a black matrix layer disposed on the first substrate or the second substrate, wherein the black matrix layer has a light shielding portion and a light transmitting portion, the light transmitting portion has a plurality of openings, the openings define a plurality of sub-pixel units, the sub-pixel units comprise a first adjusted sub-pixel unit, a second adjusted sub-pixel unit, and a standard sub-pixel unit, and the first adjusted sub-pixel unit and the second adjusted sub-pixel unit are disposed adjacent to each other; and a main spacer disposed between the first substrate and the second substrate and at least partially overlapping with the light shielding portion of the black matrix layer, wherein the main spacer is disposed on a border junction between the first adjusted sub-pixel unit and the second adjusted sub-pixel unit, but is not disposed on a border of the standard sub-pixel unit, wherein an area of the first adjusted sub-pixel unit and an area of the second adjusted sub-pixel unit are respectively greater than an area of the standard sub-pixel unit.

According to some embodiments, the first adjusted sub-pixel unit has a first edge and the light shielding portion has a light shielding protruding portion protruding from an extension line of the first edge. The light shielding protruding portion can have a light shielding edge. Two ends of the light shielding edge respectively connect to the first edge. The area of the standard sub-pixel unit is A. An area of the light shielding protruding portion surrounded by the extension line of the first edge and the light shielding edge is B. Then A and B satisfy the following formula (I):

$$(B/A) \times 100\% = 2 \sim 20\% \qquad (I).$$

According to some embodiments, the first adjusted sub-pixel unit may have a second edge. The extension line of the first edge and an extension line of the second edge intersect. The light shielding protruding portion protrudes from the extension line of the first edge and the extension line of the second edge. The light shielding protruding portion can have a light shielding edge. Two ends of the light shielding edge respectively can connect to the first edge and the second edge. The area of the standard sub-pixel unit is A. An area of the light shielding protruding portion surrounded by the extension lines of the first edge and the second edge as well as the light shielding edge is B. A and B satisfy the following formula (I):

$$(B/A) \times 100\% = 2 \sim 20\% \qquad (I).$$

According to some embodiments, an aperture ratio of the first adjusted sub-pixel unit and an aperture ratio of the second adjusted sub-pixel unit are substantially the same as an aperture ratio of the standard sub-pixel unit.

According to some embodiments, a plurality of scan lines and a plurality of data lines are disposed on the first substrate. The scan lines extend along a first direction and the data lines extend along a second direction. The first direction and the second direction are different. The first direction and the second direction can be orthogonal, or can be not orthogonal. A length of the first or second adjusted sub-pixel unit along the first direction is greater than a length of the standard sub-pixel unit along the first direction. Alternatively, a length of the first or second adjusted sub-pixel unit along the second direction is greater than a length of the standard sub-pixel unit along the second direction.

According to some embodiments, the sub-pixel units further comprise a third adjusted sub-pixel unit and a fourth adjusted sub-pixel unit. The first adjusted sub-pixel unit, the second adjusted sub-pixel unit, the third adjusted sub-pixel unit, and the fourth adjusted sub-pixel unit are arranged adjacently in a 2×2 array. The main spacer is disposed on a border junction among the first adjusted sub-pixel unit, the second adjusted sub-pixel unit, the third adjusted sub-pixel unit, and the fourth sub-pixel unit.

According to some embodiments, the sub-pixel units constitute a first adjusted pixel unit and a second adjusted pixel unit. The first adjusted pixel unit comprises the first adjusted sub-pixel unit and a fifth adjusted sub-pixel unit. The second adjusted pixel unit comprises the second adjusted sub-pixel unit and a sixth adjusted sub-pixel unit. The main spacer is not disposed on a border of the fifth adjusted sub-pixel unit or on a border of the sixth adjusted sub-pixel unit. An area of the first adjusted sub-pixel unit and an area of the second adjusted sub-pixel unit are respectively greater than an area of the fifth adjusted sub-pixel unit and an area of the sixth adjusted sub-pixel unit.

According to some embodiments, the display panel further comprises a sub-spacer disposed on the first substrate or the second substrate. The height of the sub-spacer is less than or equal to that of the main spacer. The sub-spacer can be disposed on a border of the standard sub-pixel unit selectively.

In general, the first substrate and the second substrate can be assembled using the main spacer as a support structure. The main spacer defines the thickness of the display medium. In a liquid crystal display device, an alignment layer is respectively disposed on the first substrate and the second substrate to assist the tilting of liquid crystal molecules (display medium). However, the main spacer will be respectively abutted against the first substrate and the second substrate after the first substrate and the second substrate have been assembled. Thus, the alignment layers may be abraded by external environmental stress during manufacturing process to cause light leakage. According to some embodiments, by enlarging the light shielding portion of the black matrix layer where the main spacer is disposed, the aforesaid light leakage due to damage of the alignment layer can be shielded. More specifically, the light shielding portion of the black matrix layer where the main spacer is disposed can be enlarged by forming a light shielding protruding portion. In addition, by adjusting the area of the sub-pixel units near the main spacer, macroscopic defects, such as black grids/lattices, can be avoided. The display quality of the display panel of the present disclosure can then be further improved.

DETAILED DESCRIPTION

Other objects, advantages, and novel features of the present disclosure will become more apparent from the following detailed description when taken in conjunction with the accompanying drawings. The present disclosure has been described in an illustrative manner. It is to be understood that the terminology used is intended to be in the nature of description rather than of limitation. Many modifications and variations of the present disclosure are possible in light of the above teachings. Therefore, it is to be understood that within the scope of the appended claims, the present disclosure may be practiced otherwise than as specifically described.

Hereinafter, terms, such as "first", "second", "third", in the specification and claims are only intended to make clear distinction of elements with the same name. These terms do not mean these elements are used or manufactured in any sequence.

Embodiment 1

Figure 1:
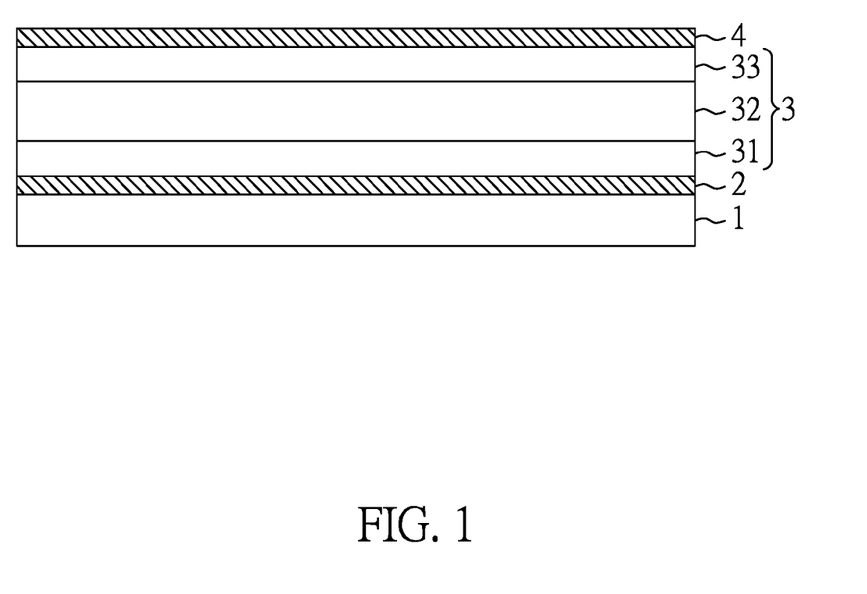
FIG. 1 is a schematic diagram showing a cross-sectional view of a display device of Embodiment 1 of the present disclosure.

FIG. 1 is a schematic diagram showing a cross-sectional view of a display device of the present embodiment. Specifically, the display device of the present embodiment comprises: a backlight module 1 as well as a first polarizer 2, a display panel 3, and a second polarizer 4 disposed on the backlight module 1 sequentially. The display panel 3 of the present embodiment comprises: a first substrate 31; a second substrate 33; and a display medium layer 32 disposed between the first substrate 31 and the second substrate 33. In the present embodiment, the first substrate 31 comprises thin film transistor units (not shown) as switches for pixels. Thus, the first substrate 31 is a thin film transistor substrate. The second substrate 33 comprises a color filter layer (not shown), a black matrix layer (not shown), and a spacer layer (not shown). Thus, the second substrate 33 is a color filter substrate. However, in other embodiments of the present disclosure, the first substrate 31 may also comprise a color filter layer (not shown). In such cases, the first substrate 31 may be a thin film transistor substrate integrated with a color filter on array (COA). Alternatively, the first substrate 31 may also comprise a black matrix layer (not shown). In such cases, the first substrate 31 may be a thin film transistor substrate integrated with a black matrix on array (BOA). Alternatively, the first substrate 31 may also comprise a spacer (not shown). In such cases, the first substrate 31 may be a thin film transistor substrate integrated with a photo spacer on array (POA). In the present embodiment, the display medium layer 32 may be a liquid crystal layer.

Figure 2:
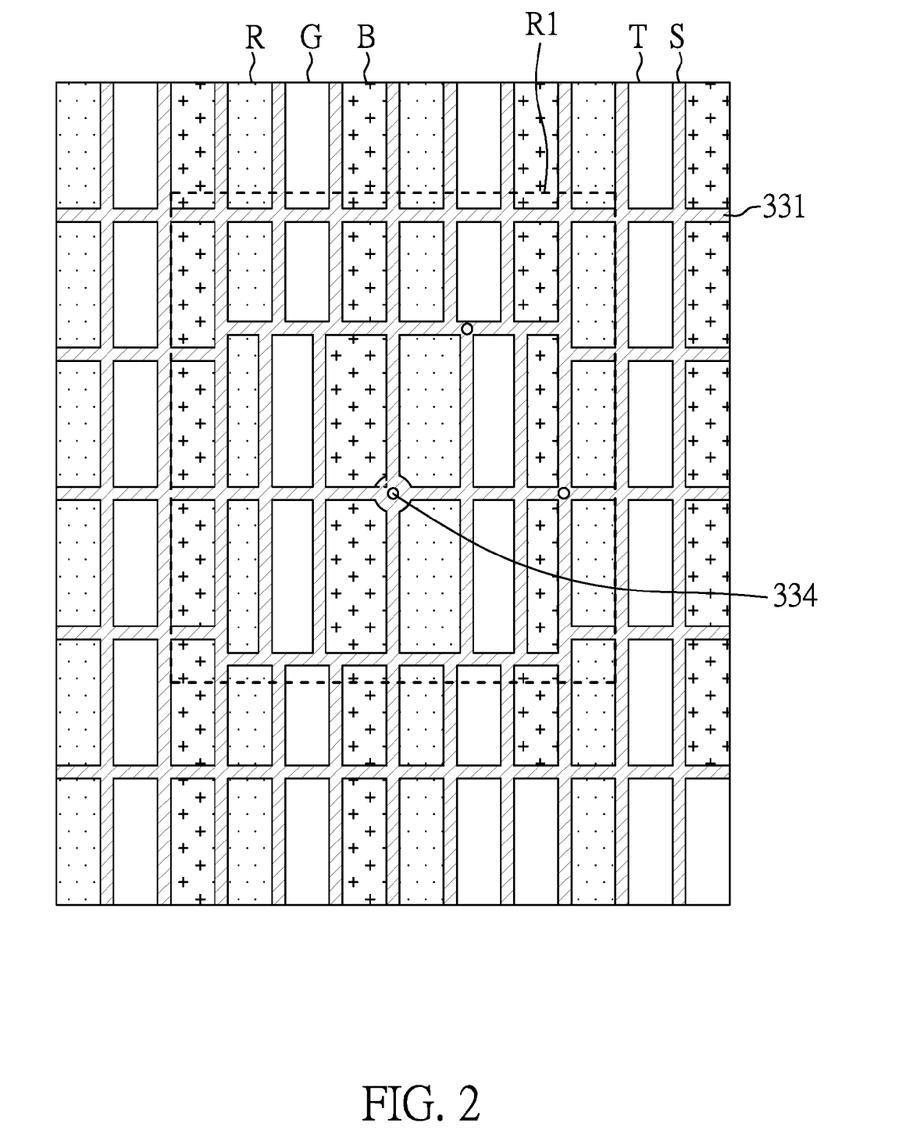
FIG. 2 is a schematic diagram showing a top view of a display panel of Embodiment 1 of the present disclosure.
Figure 3:
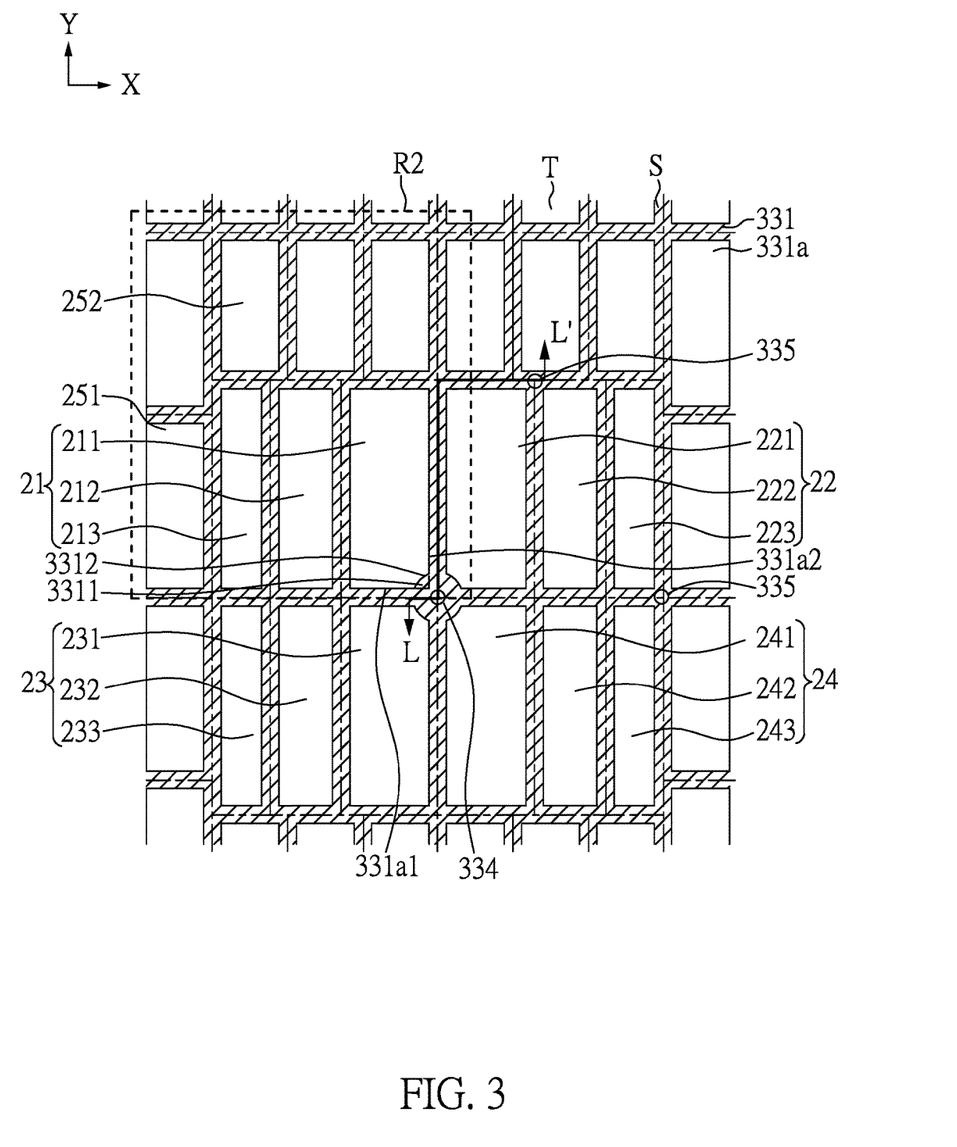
FIG. 3 is a schematic diagram showing an enlarged view of a part of the region R1 shown in FIG. 2.

Whether the second substrate is a color filter substrate, the first substrate is a thin film transistor substrate integrated with a color filter on array, the first substrate is a thin film transistor substrate integrated with a black matrix on array, or the first substrate is a thin film transistor substrate integrated with photo spacers on array, a top view of a display panel of an embodiment of the present disclosure may be that as shown in FIGS. 2-3. FIG. 3 is an enlarged view of the region R1 shown in FIG. 2. As shown in FIG. 2, the display panel of the present embodiment comprises pixel units respectively including red sub-pixel units R, green sub-pixel units G, and blue sub-pixel units B. Here, the sub-pixel units having the same type of hatch lines have the same color. However, in other embodiments of the present disclosure, the pixel units of the display panel are not limited to the aforesaid cases in which the pixel units comprise sub-pixel units of three colors. Instead, the pixel units of the display panel may also comprise sub-pixel units of four colors or more than four colors. For subsequent detailed description, the hatch lines of every sub-pixel unit in FIG. 2 have been omitted in FIG. 3.

Next, the arrangement of pixel units of a display panel of the present embodiment will be described in detail according to the case when the first substrate is a thin film transistor substrate and the second substrate is a color filter substrate.

Figure 4:
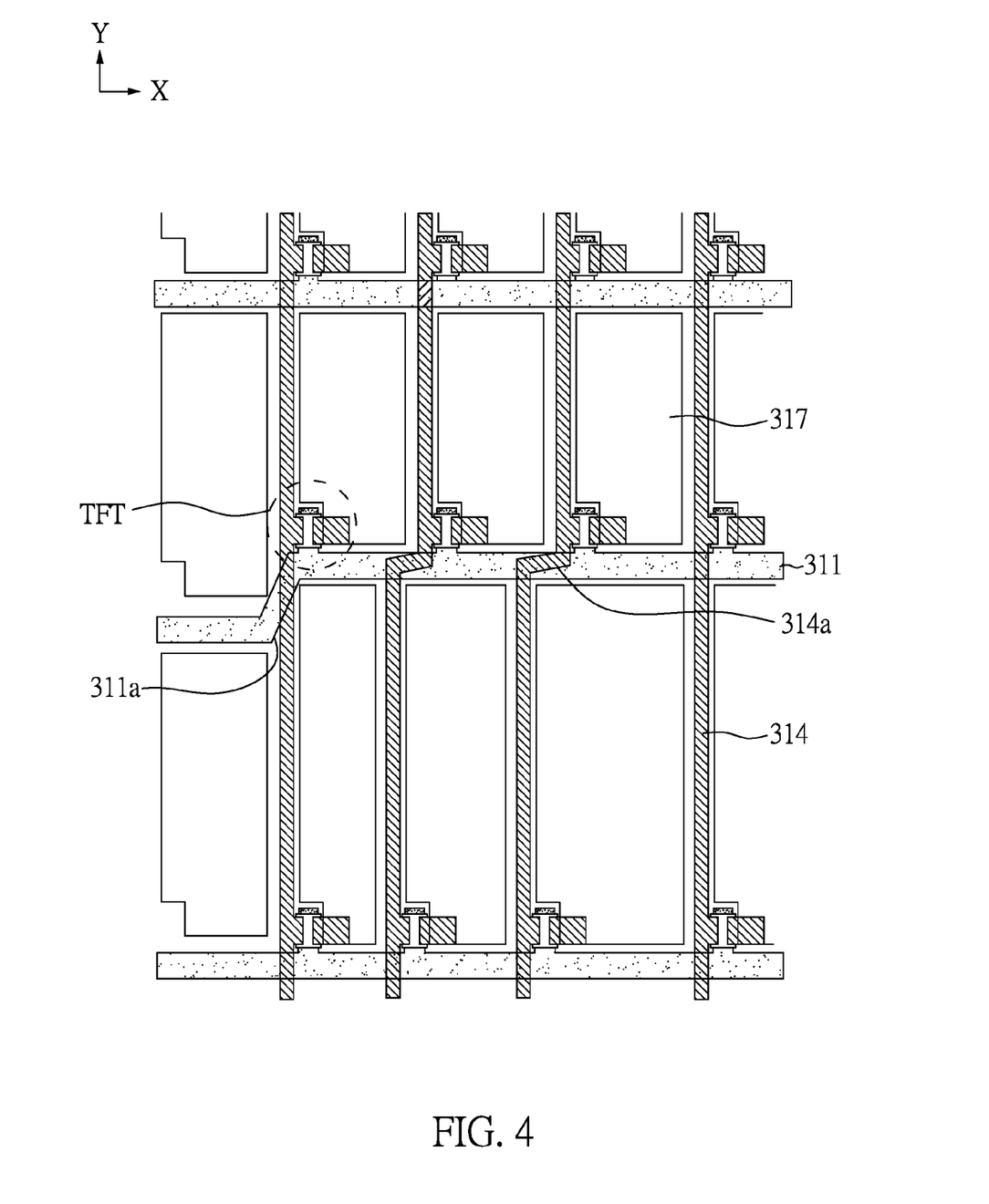
FIG. 4 is a schematic diagram showing a top view of a circuit on the first substrate correspondingly below the region R2 shown in FIG. 3.
Figure 5:
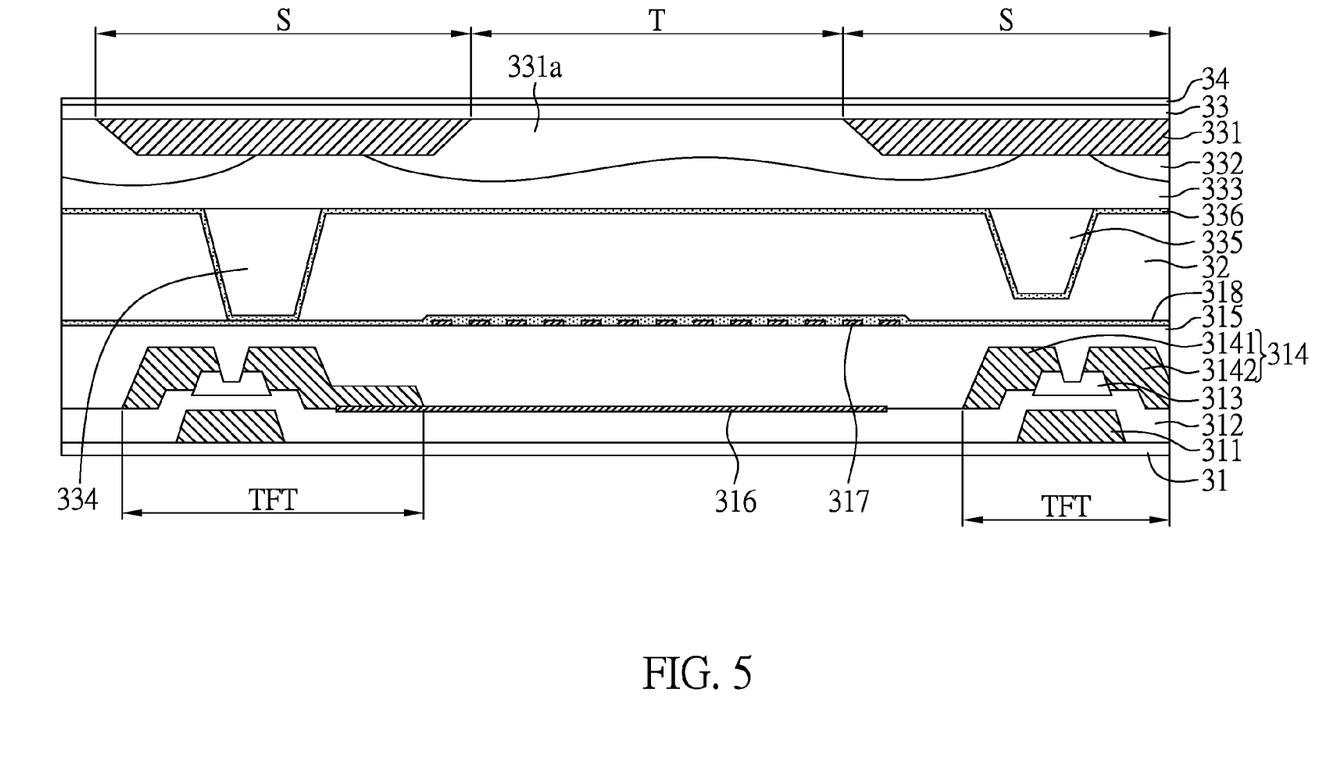
FIG. 5 is a schematic diagram showing a cross-sectional view of a display panel along the cross-sectional line L-L' shown in FIG. 3.

Please refer to FIGS. 3-5. FIG. 4 is a schematic diagram showing a top view of a circuit on the first substrate correspondingly below the region R2 shown in FIG. 3. FIG. 5 is a schematic diagram showing a cross-sectional view of a display panel along the cross-sectional line L-L' shown in FIG. 3. In the present embodiment, the display panel is a fringe field switching (FFS) display panel. However, in other embodiments of the present disclosure, the type of liquid crystals of the display panel is not limited to positive type liquid crystals or negative type liquid crystals. The driving direction of the electric field for liquid crystals is not limited to horizontal or vertical. For example, the display panel may be an in-plane switching (IPS) display panel, a twisted nematic (TN) display panel, or other types of display panels.

As shown in FIGS. 4-5, the display panel of the present embodiment comprises: a plurality of scan lines 311 disposed on the first substrate 31 and serving as a gate electrode on the thin film transistor unit region TFT; a first insulation layer 312 disposed on the scan lines 311 and serving as a gate insulation layer; a semiconductor layer 313 disposed on the first insulation layer 312; a plurality of data lines 314 disposed on the semiconductor layer 313 and serving as a source electrode 3141 and a drain electrode 3142 on the thin film transistor unit region TFT, wherein a distance between the source electrode 3141 and the drain electrode 3142 serves as a channel region; and a second insulation layer 315 disposed on the first insulation layer 312 and the data lines 314. In addition, the display panel of the present embodiment further comprises a pixel electrode layer 316 and a common electrode layer 317 disposed on the first substrate 31. The pixel electrode layer 316 is electrically connected to the drain electrode 3142. Here, the pixel electrode layer 316 is disposed below the common electrode layer 317. However, in other embodiments of the present disclosure, the common electrode layer 317 may also be disposed below the pixel electrode layer 316 as long as the pixel electrode layer 316 is electrically connected to the drain electrode 3142. According to some embodiments, one of the pixel electrode layer 316 and the common electrode layer 317 can be a plate electrode layer and the other one can be a patterned electrode layer, such as a fishbone pattern electrode or a zigzag pattern electrode. However, the present disclosure is not limited thereto.

As shown in FIGS. 4-5, the display panel of the present embodiment comprises: a black matrix layer 331 disposed on the second substrate 33 and having a light shielding portion S and a light transmitting portion T, wherein the light transmitting portion T has a plurality of openings 331a; a color filter layer 332 disposed on the black matrix layer 331 and in the openings 331a; and a third insulation layer 333 covering the black matrix layer 331 and color filter layer 332. The light shielding portion S can overlap with the scan lines 311, the thin film transistor unit region TFT, and data lines 314 on the first substrate 31. The openings 331a define a plurality of sub-pixel units. For example, as shown in FIGS. 2-3, the openings 331a define red sub-pixel units R, green sub-pixel units G, and blue sub-pixel units B. In addition, a main spacer 334 and a sub-spacer 335 are further disposed on the second substrate 33. The main spacer 334 and the sub-spacer 335 are both disposed correspondingly to the light shielding portion S of the black matrix layer 331. A height of the main spacer 334 is greater than or equal to a height of the sub-spacer 335. Here, the main spacer 334 and the sub-spacer 335 may be manufactured using a spacer material, such as a photoresist. The distance between the first substrate 31 and the second substrate 33 as well as the thickness of the display medium layer 32 can be fixed by disposing the main spacer 334.

However, in other embodiments of the present disclosure, when the first substrate 31 is a thin film transistor substrate integrated with a color filter on array (COA), the aforesaid color filter layer 332 can be disposed on the first substrate 31 and disposed correspondingly to the region where the pixel electrode layer 316 is disposed. When the first substrate 31 is a thin film transistor substrate integrated with a black matrix on array (BOA), the aforesaid black matrix layer 331 can be disposed on the first substrate 31 and disposed correspondingly to the thin film transistor unit regions TFT. The openings 331a can correspond to the region where the pixel electrode layer 316 is disposed on the first substrate 31. When the first substrate 31 is a thin film transistor substrate integrated with a photo spacer on array (POA), the aforesaid spacer 334 and sub-spacer 335 can be disposed on the first substrate 31 and disposed correspondingly to the thin film transistor unit regions TFT.

In addition, as shown in FIG. 5, a first alignment layer 318 and a second alignment layer 336 are respectively disposed on the first substrate 31 and the second substrate 33. The first and second alignment layers assist the tilting of liquid crystal molecules in the display medium layer 32 interposed in between the first and second alignment layers. Moreover, a shielding layer 34 may be further disposed on the outer side of the second substrate 33.

As shown in FIGS. 4-5, the aforesaid elements on the first substrate 31 and the second substrate 33 may be manufactured by patterning. The aforesaid elements may form on the first substrate 31 and the second substrate 32 sequentially by lamination or stacking. In the present embodiment, the first substrate 31 and the second substrate 33 may be manufactured using substrate materials, such as glass, plastic, and flexible materials. The scan lines 311 and the data lines 314 may be manufactured using conductive materials, such as metal, alloy, metal oxide, metal nitrogen oxide, or other electrode materials. The semiconductor layer 313 may be manufactured using a semiconductor material, such as amorphous silicon, polycrystalline silicon, IGZO, and the likes. The pixel electrode layer 316, the common electrode layer 317, and the shielding layer 34 may be manufactured using transparent conductive electrode materials, such as ITO, IZO, or ITZO. The first insulation layer 312, the second insulation layer 315, and the third insulation layer 333 may be manufactured using insulation layer materials, such as oxide, nitride, nitrogen oxide, or the likes. The first alignment layer 318 and the second alignment layer 336 may be manufactured using alignment layer materials, such as polyimide (PI). Alignment may be performed by brushing or by light.

As shown in FIG. 4, in the display panel of the present embodiment, the scan lines 311 extend along a first direction (i.e. the X direction in FIG. 4) and are substantially parallel to each other. The data lines 314 extend along a second direction (i.e. the Y direction in FIG. 4) and are substantially parallel to each other. The first direction and the second direction are different. The first direction and the second direction can be orthogonal, or can be not orthogonal. The scan lines 311 and the data lines 314 may intersect. For example, the scan lines 311 and the data lines 314 may be substantially perpendicular to each other or substantially not perpendicular to each other. Here, "substantially parallel" means the absolute value of the angle between two elements is in between 0° and 5°. "Substantially perpendicular" means the absolute value of the angle between two elements is in between 85° and 90°.

Next, the design of each sub-pixel unit in the display panel of the present embodiment will be described in detail. In the present embodiment, the plurality of openings of the black matrix layer defines the plurality of sub-pixel units. The plurality of sub-pixel units may respectively constitute the plurality of pixel units. For example, a red sub-pixel unit R, a green sub-pixel unit G, and a blue sub-pixel unit B may constitute a pixel unit together. In the present embodiment, a pixel unit is constituted by three sub-pixel units. However, the present disclosure is not limited thereto. In the present disclosure, a pixel unit may comprise two, three, four, or more sub-pixel units.

As shown in FIGS. 3-4, the plurality of sub-pixel units constitutes a first adjusted pixel unit 21, a second adjusted pixel unit 22, a third adjusted pixel unit 23, and a fourth adjusted pixel unit 24. The first adjusted pixel unit 21, the second adjusted pixel unit 22, the third adjusted pixel unit 23, and the fourth adjusted pixel unit 24 are arranged adjacently in a 2×2 array. The first adjusted pixel unit 21 comprises a first adjusted sub-pixel unit 211 and fifth adjusted sub-pixel units 212, 213. The second adjusted pixel unit 22 comprises a second adjusted sub-pixel unit 221 and sixth adjusted sub-pixel units 222, 223. The third adjusted pixel unit 23 comprises a third adjusted sub-pixel unit 231 and seventh adjusted sub-pixel units 232, 233. The fourth adjusted pixel unit 24 comprises a fourth adjusted sub-pixel unit 241 and eighth adjusted sub-pixel units 242, 243. The first adjusted sub-pixel unit 211, the second adjusted sub-pixel unit 221, the third adjusted sub-pixel unit 231, and the fourth adjusted sub-pixel unit 241 are arranged adjacently in a 2×2 array.

As shown in FIG. 3, in the display panel of the present embodiment, the main spacer 334 at least partially overlaps with the light shielding portion of the black matrix layer. The main spacer 334 can be disposed on a border junction among the first adjusted sub-pixel unit 211, the second adjusted sub-pixel unit 221, the third adjusted sub-pixel unit 231, and the fourth adjusted sub-pixel unit 241. The main spacer 334 can be not disposed on borders of the fifth adjusted sub-pixel units 212, 213, the sixth adjusted sub-pixel units 222, 223, the seventh adjusted sub-pixel units 232, 233, and the eight adjusted sub-pixel units 242, 243. The sub-spacer 335, however, may be disposed selectively on the borders of the fifth adjusted sub-pixel units 212, 213, the sixth adjusted sub-pixel units 222, 223, the seventh adjusted sub-pixel units 232, 233, and the eight adjusted sub-pixel units 242, 243.

As shown in FIG. 5, after the first substrate 31 and the second substrate 33 are assembled, the distance between the first substrate 31 and the second substrate 33 as well as the thickness of the display medium layer 32 can be fixed by the main spacer 334. Specifically, after the first substrate 31 and the second substrate 33 are assembled, the main spacer 334 can contact the first alignment layer 318 and the second alignment layer 336 directly. The external environmental stress during manufacturing process may cause displacement of the main spacer 334 or cause friction between the main spacer 334 and the first alignment layer 318 and/or the second alignment layer 336. Consequently, the first alignment layer 318 and/or the second alignment layer 336 may be scratched. The display panel manufactured may thereby have light leakage. Accordingly, in the present embodiment, as shown in FIG. 3, by enlarging the area of the light shielding portion of the black matrix layer 331 where the main spacer 334 is disposed, the aforesaid light leakage can be shielded.

More specifically, as shown in FIG. 3, the light transmitting portion T of the black matrix layer 331 comprises the plurality of openings 331a. The openings 331a define the aforesaid sub-pixel units. The first adjusted sub-pixel unit 211 has a first edge 331a1 and a second edge 331a2. An extension line of the first edge 331a1 and an extension line of the second edge 331a2 intersect. The light shielding portion S of the black matrix layer 331 further comprises a light shielding protruding portion 3311. The light shielding protruding portion 3311 protrudes from the extension line of the first edge 331a1 and the extension line of the second edge 331a2. By forming the light shielding protruding portion 3311, the light shielding portion S of the black matrix layer 331 where the main spacer 334 is disposed is enlarged. Consequently, even if the first alignment layer 318 and/or the second alignment layer 336 are/is scratched due to external environmental stress during manufacturing process, the light leakage resulted can be shielded by the light shielding protruding portion 3311 of the black matrix layer 331.

The above description is according to the case in which the light shielding protruding portion 3311 is at the edges of the first adjusted sub-pixel unit 211. As shown in FIG. 3, the light shielding protruding portion can also be at edges of the second adjusted sub-pixel unit 221, the third adjusted sub-pixel unit 231, and the fourth adjusted sub-pixel unit 241.

If an area of the light shielding protruding portion 3311 of the black matrix layer 331 is too large, macroscopic and visible display defects, such as black grids/lattices, may be produced (such display defect is known as mura). The display quality will then be reduced. Accordingly, in the present embodiment, for the enlarged light shielding portion S, the corresponding sub-pixel unit can also be designed to be enlarged. That is to say, on the position where the main spacer 334 is disposed, the light shielding portion S is enlarged, and the corresponding sub-pixel unit adjacent to the enlarged light shielding region can also be enlarged. Thus, the aforesaid display defect can be avoided. According to some embodiments, by enlarging areas of the first adjusted sub-pixel unit 211, the second adjusted sub-pixel unit 221, the third adjusted sub-pixel unit 231, and the fourth adjusted sub-pixel unit 241, the aforesaid display defect can be avoided. Enlargement on the sub-pixel unit means that the sub-pixel unit is enlarged compared to a standard sub-pixel unit. For example, referring to FIG. 3, the area of the first adjusted sub-pixel unit 211 is larger than a standard sub-pixel unit 251. The standard sub-pixel unit 251 is not enlarged and is a standard one, which is not included in any adjusted pixel unit, 21, 22, 23, or 24.

More specifically, as shown in FIG. 3, the main spacer 334 is disposed on the border junction among the first adjusted sub-pixel unit 211, the second adjusted sub-pixel unit 221, the third adjusted sub-pixel unit 231, and the fourth adjusted sub-pixel unit 241. The main spacer 334 can at least partially overlap with the light shielding portion of the black matrix layer 331. In FIG. 3, the main spacer 334 can be completely covered by the light shielding portion. There is no main spacer 334 disposed on borders of the standard sub-pixel unit 251. The sub-spacer 335, however, may be disposed selectively on the borders of the standard sub-pixel unit 251. Thus, in the present embodiment, areas of the first adjusted sub-pixel unit 211, the second adjusted sub-pixel unit 221, the third adjusted sub-pixel unit 231, and the fourth adjusted sub-pixel unit 241 can be respectively designed to be larger than an area of the standard sub-pixel unit 251.

In addition, there is no main spacer 334 disposed on borders of the fifth adjusted sub-pixel units 212, 213, the sixth adjusted sub-pixel units 222, 223, the seventh adjusted sub-pixel units 232, 233, and the eight adjusted sub-pixel units 242, 243. Thus, in the present embodiment, the areas of the first adjusted sub-pixel unit 211, the second adjusted sub-pixel unit 221, the third adjusted sub-pixel unit 231, and the fourth adjusted sub-pixel unit 241 can be respectively designed to be larger than areas of the fifth adjusted sub-pixel units 212, 213, the sixth adjusted sub-pixel units 222, 223, the seventh adjusted sub-pixel units 232, 233, and the eight adjusted sub-pixel units 242, 243. According to some embodiments, the sub-pixel units closest to the main spacer 334, for example, the first adjusted sub-pixel unit 211, the second adjusted sub-pixel unit 221, the third adjusted sub-pixel unit 231, and the fourth adjusted sub-pixel unit 241 have the largest areas. The sub-pixel units farthest away from the main spacer 334, for example, the fifth adjusted sub-pixel unit 213, the sixth adjusted sub-pixel unit 223, the seventh adjusted sub-pixel unit 233, and the eight adjusted sub-pixel unit 243 have the smallest areas. However, the present disclosure is not limited thereto. Other modifications and variations can be implemented according to different arrangements of pixel units.

In the present disclosure, as shown in FIGS. 3-4, the method used to enlarge the areas of the first adjusted sub-pixel unit 211, the second adjusted sub-pixel unit 221, the third adjusted sub-pixel unit 231, and the fourth adjusted sub-pixel unit 241 is not particularly limited. The area may be adjusted along the extending direction X of the scan lines 311 and/or the extending direction Y of the data lines 314. For example, lengths of the first adjusted sub-pixel unit 211, the second adjusted sub-pixel unit 221, the third adjusted sub-pixel unit 231, and the fourth adjusted sub-pixel unit 241 along the extending direction X of the scan lines 311 can be designed to be greater than a length of the standard sub-pixel unit 251 along the extending direction X of the scan lines 311. Lengths of the first adjusted sub-pixel unit 211, the second adjusted sub-pixel unit 221, the third adjusted sub-pixel unit 231, and the fourth adjusted sub-pixel unit 241 along the extending direction Y of the data lines 314 can be designed to be greater than a length of the standard sub-pixel unit 251 along the extending direction Y of the data lines 314.

As shown in FIGS. 3-4, using the first adjusted pixel unit 21 and the adjacent standard sub-pixel unit 251 along the extending direction X of the scan lines 311 as an example, the length of the first adjusted sub-pixel unit 211 along the extending direction Y of the data lines 314 is greater than the length of the standard sub-pixel unit 251 along the extending direction Y of the data lines 314. In this case, the scan line 311 disposed on the same side of the first adjusted sub-pixel unit 211 and the standard sub-pixel unit 251 has a bevel edge 311a at a border junction between the first adjusted sub-pixel unit 211 and the standard sub-pixel unit 251.

In addition, as shown in FIGS. 3-4, using the first adjusted pixel unit 21 and an adjacent standard sub-pixel unit 252 along the extending direction Y of the data lines 314 as an example, the length of the first adjusted sub-pixel unit 211 along the extending direction X of the scan lines 311 is greater than a length of the standard sub-pixel unit 252 along the extending direction X of the scan lines 311. In this case, the data line 314 disposed on the same side of the first adjusted sub-pixel unit 211 and the standard sub-pixel unit 252 has a bevel edge 314a at a border junction between the first adjusted sub-pixel unit 211 and the standard sub-pixel unit 252.

Moreover, as shown in FIG. 3, in the present embodiment, since the lengths of the sub-pixel units in the first adjusted pixel unit 21, the second adjusted pixel unit 22, the third adjusted pixel unit 23, and the fourth adjusted pixel unit 24 along the extending direction Y of the data lines 314 are designed to be increased; thus, the lengths of the standard sub-pixel units 252 adjacent to the first, second, third, fourth adjusted pixel units 21, 22, 23, and 24 along the extending direction Y of the data lines 314 can be designed to be decreased selectively.

In the embodiments of the present disclosure, aperture ratios of the first adjusted sub-pixel unit 211, the second adjusted sub-pixel unit 221, the third adjusted sub-pixel unit 231, and the fourth adjusted sub-pixel unit 241 may be designed to be substantially the same as an aperture ratio of the standard sub-pixel unit 251 in order to achieve good display effect. Here, "substantially the same" means the difference between two values is within 5%.

According to the embodiments of the present disclosure, the area of the light shielding protruding portion may be designed appropriately to achieve good display effect. For example, as shown in FIG. 3 and using the first adjusted sub-pixel unit 211 as an example, the light shielding protruding portion 3311 adjacent to and defining the first adjusted sub-pixel unit 211 has a light shielding edge 3312. Two ends of the light shielding edge 3312 respectively connect to the first edge 331a1 and the second edge 331a2 of the first adjusted sub-pixel unit 211. The area (open area) of the standard sub-pixel unit 251 is set to be A and an area of the light shielding protruding portion 3311 surrounded by the extension lines of the first edge 331a1 and the second edge 331a2 as well as the light shielding edge 3312 is set to be B, A and B will satisfy the following formula (I):

$$(B/A) \times 100\% = 2\text{~}20\% \qquad (I).$$

The above description is based on the first adjusted sub-pixel unit 211. Similarly, the areas of the light shielding protruding portions at the edges of the second adjusted sub-pixel unit 221, the third adjusted sub-pixel unit 231, and the fourth adjusted sub-pixel unit 241 may also be designed to satisfy the above formula (I).

In the present embodiment, the main spacer 334 is disposed on a border junction among the first adjusted pixel unit 21, the second adjusted pixel unit 22, the third adjusted pixel unit 23, and the fourth adjusted pixel unit 24, which are included in four different pixel units. However, the present disclosure is not limited thereto. In other embodiments of the present disclosure, the main spacer 334 may be disposed on a border junction between adjacent sub-pixel units in the same pixel unit. As long as the aforesaid conditions of how the light shielding portion of the black matrix layer may be enlarged are satisfied, the main spacer 334 may be disposed in other ways.

Embodiment 2

Figure 6:
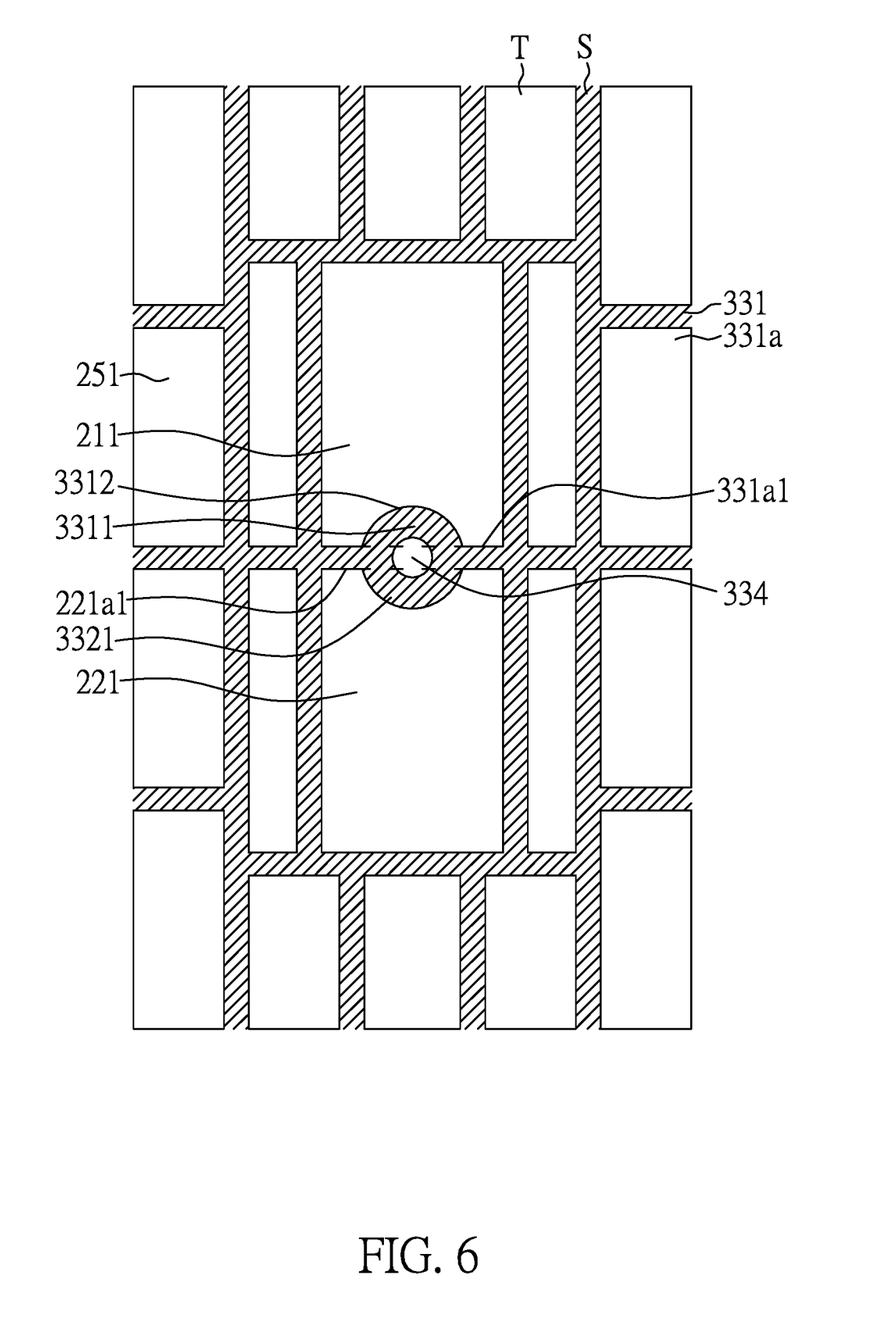
FIG. 6 is a schematic diagram showing a top view of a display panel of Embodiment 2 of the present disclosure.

FIG. 6 is a schematic diagram showing a top view of a display panel of the present embodiment. The structures of the display device and the display panel of the present embodiment are similar to that of Embodiment 1. The difference is that the display device of the present embodiment does not comprise the third adjusted sub-pixel unit 231 and the fourth adjusted sub-pixel unit 241 of Embodiment 1 on the display panel.

More specifically, in Embodiment 1, the main spacer 334 is disposed on the border junction among the first adjusted sub-pixel unit 211, the second adjusted sub-pixel unit 221, the third adjusted sub-pixel unit 231, and the fourth adjusted sub-pixel unit 241. However, in the present embodiment, the main spacer 334 is disposed on a border junction between the first adjusted sub-pixel unit 211 and the second adjusted sub-pixel unit 221.

The first adjusted sub-pixel unit 211 comprises a first edge 331a1. The light shielding portion S of the black matrix layer 331 further comprises a light shielding protruding portion 3311. The light shielding protruding portion 3311 protrudes from an extension line of the first edge 331a1. Similarly, a light shielding protruding portion 3321 may be adjacent to and defining the second adjusted sub-pixel unit 221, which may also be disposed on an extension line of an edge 221a1 of the second adjusted sub-pixel unit 221.

According to the embodiments of the present disclosure, the area of the light shielding protruding portion may be designed appropriately to achieve good display effect. For example, as shown in FIG. 6, in the present embodiment, the light shielding protruding portion 3311 of the black matrix layer 331 protrudes from the extension line of the first edge 331a1 of the first adjusted sub-pixel unit 211. The light shielding protruding portion 3311 has a light shielding edge 3312. Two ends of the light shielding edge 3312 respectively connect to the first edge 331a1 of the first adjusted sub-pixel unit 211. The area (open area) of the standard sub-pixel unit 251 is set to be A and an area of the light shielding protruding portion 3311 surrounded by the extension line of the first edge 331a1 and the light shielding edge 3312 is set to be B, A and B will satisfy the following formula (I):

$$(B/A) \times 100\% = 2 \sim 20\% \tag{I}$$

The above description is based on the first adjusted sub-pixel unit 211. Similarly, the area of the light shielding protruding portion at the edge 221a1 of the second adjusted sub-pixel unit 221 may also be designed to satisfy the above formula (I).

For the display panels and the display devices of Embodiment 1 and Embodiment 2, by enlarging the light shielding region of the black matrix layer where the main spacer is disposed, the light leakage due to the alignment layers being scratched by external environmental stress during manufacturing process can be prevented. Furthermore, by adjusting the areas of the sub-pixel units near the main spacer, macroscopic and visible display defects, such as black grids/lattices, can be avoided. Accordingly, according to some embodiments, the display quality of the display panels and the display devices can be enhanced.

It should be noted here that the arrangements of the pixel units of the display panels in the above embodiments are not the only arrangements of the present disclosure. The present disclosure is not limited thereto. In the present disclosure, the arrangement of the pixel units may be changed according to different needs. According to some embodiments, the light shielding portion where the main spacer is disposed can be enlarged and the areas of the sub-pixel units disposed adjacent to the main spacer can be adjusted, the aforesaid light leakage can be prevented and the display quality can be enhanced.

In the present disclosure, the display panels manufactured in the aforesaid embodiments may also be used with any touch panels together to form touch display devices. The display panels or the touch display devices manufactured in the aforesaid embodiments of the present disclosure may be used in any electronic devices requiring display screens known in the present technical field. For example, monitors, mobile phones, laptop computers, video cameras, cameras, music players, mobile navigation devices, televisions, and the likes.

Although the present disclosure has been explained in relation to its preferred embodiments, it is to be understood that many other possible modifications and variations can be made without departing from the spirit and scope of the present disclosure as hereinafter claimed.

What is claimed is:

1. A display device, comprising:
   a first substrate;
   a second substrate disposed opposite to the first substrate;
   a black matrix layer disposed on the first substrate or the second substrate, wherein the black matrix layer has a light shielding portion and a light transmitting portion, the light transmitting portion has a plurality of openings, the openings define a plurality of sub-pixel units, the sub-pixel units comprise a first adjusted sub-pixel unit, a second adjusted sub-pixel unit, and a standard sub-pixel unit, and the first adjusted sub-pixel unit and the second adjusted sub-pixel unit are disposed adjacent to each other; and
   a main spacer disposed between the first substrate and the second substrate and at least partially overlapping with the light shielding portion of the black matrix layer,
   wherein the main spacer is disposed on a border junction between the first adjusted sub-pixel unit and the second adjusted sub-pixel unit, but is not disposed on a border of the standard sub-pixel unit,
   wherein an area of the first adjusted sub-pixel unit and an area of the second adjusted sub-pixel unit are respectively greater than an area of the standard sub-pixel unit;
   wherein the sub-pixel units constitute a first adjusted pixel unit and a second adjusted pixel unit, the first adjusted pixel unit comprises the first adjusted sub-pixel unit and a fifth adjusted sub-pixel unit, the second adjusted pixel unit comprises the second adjusted sub-pixel unit and a sixth adjusted sub-pixel unit;
   wherein the main spacer is not disposed on a border of the fifth adjusted sub-pixel unit or on a border of the sixth adjusted sub-pixel unit, and an area of the first adjusted sub-pixel unit and an area of the second adjusted sub-pixel unit are respectively greater than an area of the fifth adjusted sub-pixel unit and an area of the sixth adjusted sub-pixel unit.

2. The display device as claimed in claim 1, wherein the first adjusted sub-pixel unit has a first edge, and the light shielding portion has a light shielding protruding portion protruding from an extension line of the first edge.

3. The display device as claimed in claim 2, wherein the light shielding protruding portion has a light shielding edge, two ends of the light shielding edge respectively connect to the first edge; wherein the area of the standard sub-pixel unit is A, an area of the light shielding protruding portion surrounded by the extension line of the first edge and the light shielding edge is B, and A and B satisfy the following formula (I):

$$(B/A) \times 100\% = 2 \sim 20\% \tag{I}$$

4. The display device as claimed in claim 2, wherein the first adjusted sub-pixel unit has a second edge, the extension line of the first edge and an extension line of the second edge intersect, and the light shielding protruding portion protrudes from the extension line of the first edge and the extension line of the second edge.

5. The display device as claimed in claim 4, wherein the light shielding protruding portion has a light shielding edge, two ends of the light shielding edge respectively connect to the first edge and the second edge; wherein the area of the standard sub-pixel unit is A, an area of the light shielding protruding portion surrounded by the extension lines of the first edge and the second edge as well as the light shielding edge is B, and A and B satisfy the following formula (I):

$$(B/A) \times 100\% = 2 \sim 20\%. \qquad (I)$$

6. The display device as claimed in claim 1, wherein an aperture ratio of the first adjusted sub-pixel unit and an aperture ratio of the second adjusted sub-pixel unit are substantially the same as an aperture ratio of the standard sub-pixel unit.

7. The display device as claimed in claim 1, wherein a plurality of scan lines and a plurality of data lines are disposed on the first substrate, the scan lines extend along a first direction and the data lines extend along a second direction, and the first direction and the second direction are different;

wherein a length of the first adjusted sub-pixel unit along the first direction is greater than a length of the standard sub-pixel unit along the first direction.

8. The display device as claimed in claim 1, wherein a plurality of scan lines and a plurality of data lines are disposed on the first substrate, the scan lines extend along a first direction and the data lines extend along a second direction, and the first direction and the second direction are different;

wherein a length of the first adjusted sub-pixel unit along the second direction is greater than a length of the standard sub-pixel unit along the second direction.

9. The display device as claimed in claim 1, wherein the sub-pixel units comprise a third adjusted sub-pixel unit and a fourth adjusted sub-pixel unit, the first adjusted sub-pixel unit, the second adjusted sub-pixel unit, the third adjusted sub-pixel unit, and the fourth adjusted sub-pixel unit are arranged adjacently in a 2×2 array, and the main spacer is disposed on a border junction among the first adjusted sub-pixel unit, the second adjusted sub-pixel unit, the third adjusted sub-pixel unit, and the fourth sub-pixel unit.

* * * * *